United States Patent
Burkes et al.

(10) Patent No.: US 8,606,389 B2
(45) Date of Patent: Dec. 10, 2013

(54) METHOD TO CONSTRUCT AND PHYSICALLY JOIN BUILDING BLOCKS INTO A NEAR-NET SHAPED PART USING AN INTERFACIAL REACTION-ACTIVATION MECHANISM

(75) Inventors: James M. Burkes, San Antonio, TX (US); Paul T. Evans, San Antonio, TX (US); Cliff J. Scribner, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 889 days.

(21) Appl. No.: 12/031,448

(22) Filed: Feb. 14, 2008

(65) Prior Publication Data

US 2009/0276070 A1    Nov. 5, 2009

Related U.S. Application Data

(60) Provisional application No. 60/890,074, filed on Feb. 15, 2007.

(51) Int. Cl.
*G06F 19/00* (2011.01)
*B29C 65/00* (2006.01)
*B31B 1/60* (2006.01)
*B32B 37/00* (2006.01)

(52) U.S. Cl.
USPC ............. 700/119; 700/95; 700/98; 700/117; 700/118; 156/60

(58) Field of Classification Search
USPC .................. 700/95, 98, 117–119; 156/60
See application file for complete search history.

(56) References Cited

U.S. PATENT DOCUMENTS

| | | | |
|---|---|---|---|
| 4,258,521 A * | 3/1981 | Fricker et al. | 52/406.3 |
| 5,440,193 A * | 8/1995 | Barrett | 310/328 |
| 5,980,813 A | 11/1999 | Narang et al. | 264/401 |
| 6,277,473 B1 * | 8/2001 | McGinn | 428/188 |
| 6,380,314 B1 | 4/2002 | Soane et al. | 525/242 |
| 6,558,606 B1 * | 5/2003 | Kulkarni et al. | 264/401 |
| 6,648,977 B2 | 11/2003 | Goela et al. | 118/728 |
| 6,695,967 B2 | 2/2004 | Bishop et al. | 210/510.1 |
| 6,749,779 B2 | 6/2004 | Soane et al. | 264/1.1 |
| 6,764,620 B1 | 7/2004 | Palmisiano et al. | 264/29.7 |
| 6,874,885 B2 * | 4/2005 | Soane et al. | 351/159 |
| 6,940,506 B2 * | 9/2005 | Mashimo | 345/423 |
| 7,008,672 B2 | 3/2006 | Gordeev et al. | 427/249.8 |
| 7,036,550 B2 | 5/2006 | Schaffer et al. | 164/97 |
| 7,093,936 B2 | 8/2006 | Soane et al. | 351/159 |
| 7,524,389 B2 * | 4/2009 | Elbs et al. | 156/242 |

(Continued)

FOREIGN PATENT DOCUMENTS

JP    2007272403 A  * 10/2007

OTHER PUBLICATIONS

Papangelis, J.P. et al. "Computer Analysis of Thin-walled Structural Members", Jan. 1994, Pergamon, Computers & Structures vol. 56, No. 1, pp. 157-176.*

*Primary Examiner* — Kavita Padmanabhan
*Assistant Examiner* — Jason Lin
(74) *Attorney, Agent, or Firm* — Chowdhury & Georgakis PC; Ann C. Livingston

(57) ABSTRACT

The disclosure provides a method to construct and physically join near-net shaped structural building blocks into a composite part using an interfacial reaction-activation mechanism.

7 Claims, 1 Drawing Sheet

(56) References Cited

U.S. PATENT DOCUMENTS

| | | | |
|---|---|---|---|
| 2004/0020974 A1* | 2/2004 | Becker et al. | 228/212 |
| 2004/0089965 A1* | 5/2004 | Malfliet et al. | 264/46.6 |
| 2004/0128016 A1* | 7/2004 | Stewart | 700/159 |
| 2007/0063378 A1* | 3/2007 | O'Donoghue | 264/219 |

* cited by examiner ated with the use of, or actuation of, the reaction-activation mechanism.

METHOD TO CONSTRUCT AND PHYSICALLY JOIN BUILDING BLOCKS INTO A NEAR-NET SHAPED PART USING AN INTERFACIAL REACTION-ACTIVATION MECHANISM

RELATED PATENT APPLICATION

This application claims the benefit of U.S. Provisional Application No. 60/890,074, filed Feb. 15, 2007 and entitled "METHOD TO CONSTRUCT AND PHYSICALLY JOIN NEAR-NET SHAPED STRUCTURAL BUILDING BLOCKS INTO A COMPOSITE PART USING AN INTERFACIAL REACTION-ACTIVATION MECHANISM."

TECHNICAL FIELD

The present disclosure is related to manufacturing machine parts, and more specifically to a method of constructing and physically joining building blocks into a near-net part using an interfacial reaction-activation mechanism.

BACKGROUND OF THE DISCLOSURE

Manufacturing and machining of large-scale aircraft components provide challenges to traditional methods. In large scale production of components, both time and cost of machining are driven, in large part, by the need to remove material inherent in making parts from solid billets. This cost is dramatic for those parts made from exotic or expensive materials, such as titanium family alloys.

A reduction in the amount of material to be removed between the starting point and the finished component would reduce both the amount of machine time required and the amount of wasted material. It has been estimated that from 50% to 90% of a typical machined titanium part ends up as chips. In any machining process, a reduction in material to be removed offers a reduction in machining time required. Efforts to more closely match the starting piece to the finished piece are often focused on efficiently creating "near-net shaped" components, that is, components very near their final shape.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein.

DETAILED DESCRIPTION OF THE DISCLOSURE

Figure 1:
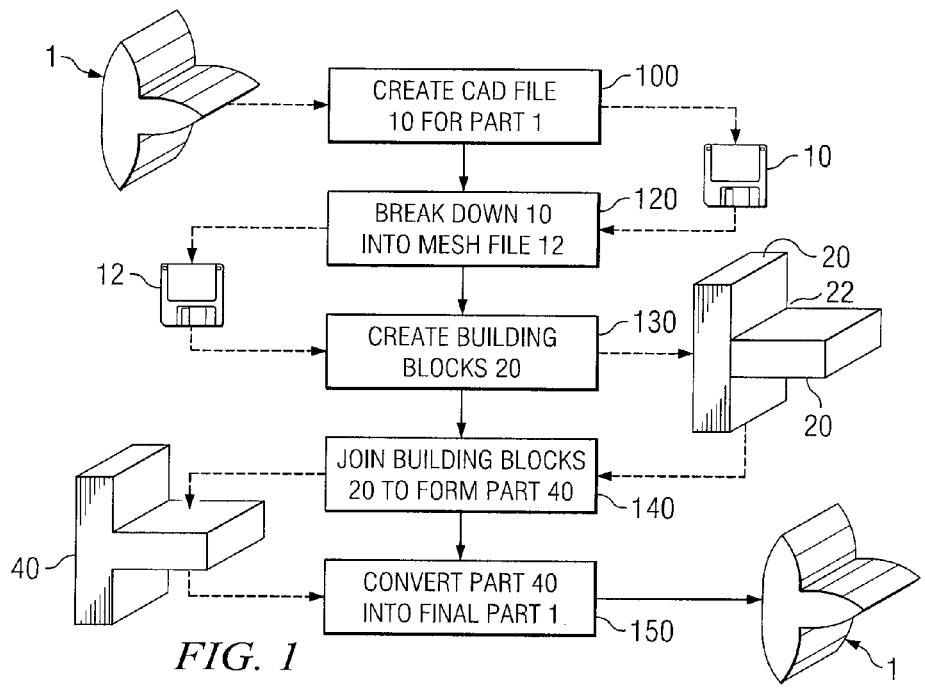
FIG. 1 is a flow chart showing a process for constructing and physically joining building blocks into a near-net shaped part using an interfacial reaction-activation mechanism.
Figure 2:
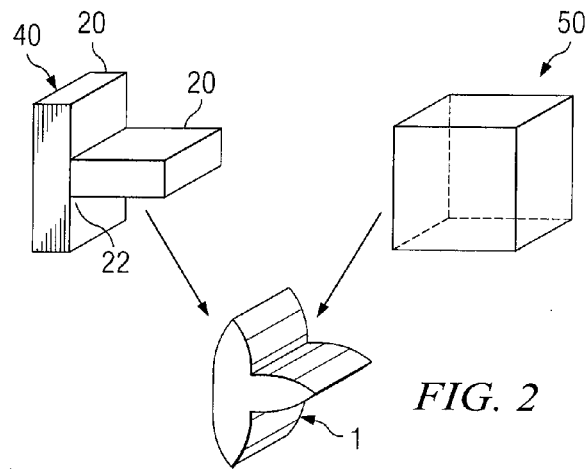
FIG. 2 represents a near-net shaped composite part in comparison to a solid billet, both of which may be used to form a final part.
Figure 3:
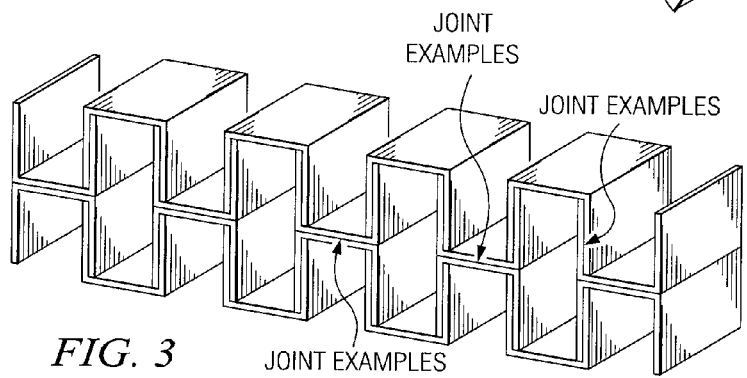
FIG. 3 depicts one alternative form for structural building blocks used in an embodiment of the present disclosure.

Preferred embodiments of the disclosure and its advantages are best understood by reference to FIGS. 1-3 wherein like numbers refer to same and like parts.

The manufacture of components, whether for small or large systems, simple or complicated devices, and large or small scale runs, includes multiple cost factors. In any manufacturing process that involves machining parts, there are at least two factors that contribute to the overall cost of the part. Depending on the part at issue, the majority of its cost may be connected to the machine time required to complete the part. In other systems, it is the cost of the raw material that dominates the total cost.

A process that provides reduction in overall cost is always of interest. For instance, a process to manufacture components for complicated systems, such as large-scale aircraft components, that shortens machine time results in large savings. In addition, less waste material results in savings, especially in systems using exotic materials, such as titanium alloys. Teachings of the present disclosure may be applied to a wide variety of manufacturing endeavors to achieve savings over traditional processes.

The term "near-net shape" is used herein to include any type of part or component with an initial shape designed or configured to have physical dimensions very near the final dimensions of the part. The near-net shape reduces the effort of a material removal process such as machining. Some examples of currently available processes for creating parts with near-net shape include, but are not limited to, rapid prototyping processes, metal injection molding, isostatic pressing, gelcasting, and superplastic forming.

The term "rapid prototyping" is used herein to include any currently available or later developed technology using freeform fabrication to produce three dimensional parts. Many conventional rapid prototyping systems convert computer models of three dimensional parts into corresponding models of layers or slices. The systems then physically create the layers or slices and fuse them to one another to build the three dimensional part. Examples of rapid prototyping systems currently available include, but are not limited to, Selective Laser Sintering (SLS), Stereo Lithography Assembly (SLA), Fused Deposition Modeling (FDM), Perfactory type systems, Paper Lamination Technology, Laminated Object Manufacturing, Solid Creation Stereolithography, Solid Imager Stereolithography, Rapid Meister Stereolithography, and Digital Light Processing.

The term "active control" of structure is used herein to mean providing a structural response by adding external effort to the structure. A number of materials may be used to this end as actuators, such as fibers, films, and/or rods that can be assembled and controlled by electrical charges and/or pulses. Current research in materials for active control of structures includes, but is not limited to, nickel-titanium (NiTi) shape memory alloys and electrically conducting polymers. These materials can contract or expand in response to an electrical input or other stimulus.

The term "reaction-activation mechanism" may include any one of a variety of processes. For instance, activation may be achieved through chemical, electrical, thermal, mechanical and/or optical means. Once activated, the reaction may generate heat and/or metallurgical chemistry. In some instances, a reaction-activation mechanism may be used to join two or more parts in such a manner as to provide structural integrity.

The term "CAD" includes a wide range of computer based tools used to perform computer aided design. CAD tools are often integrated into computer drafting packages, such as two dimensional vector based drafting programs and/or three dimensional solid and surface modelers.

FIG. 1 is a flowchart illustrating a method of constructing and physically joining structural building blocks into a near-net shaped part using an interfacial reaction-activation mechanism, according to one embodiment of the present disclosure.

At Step 100, CAD file 10 is created representing final part 1, which is to be composed of building blocks as described below. CAD file 10 may include any file generated by a CAD process and may be stored in any appropriate format. In some embodiments, CAD file 10 may be generated by a user running a computer aided three dimensional modeling program. In some embodiments, CAD file 10 may include data stored in electrically-programmable read-only memory (EPROM), a field-programmable gate array (FPGA), a computer disk, a flash drive, punch cards or any other system suitable for such storage.

At Step 120, CAD file 10 is analyzed and broken down into mesh file 12. Mesh file 12 may include any representation of final part 1 broken into building blocks 20. Building blocks 20 may include any number of basic shapes and parts which may be used to construct an aggregate component. For example, building blocks 20 may include tubes, blocks, cubes, plates, and/or any other shape or configuration that may be useful for assembling a final component. Mesh file 12 may include an indication of surfaces on building blocks 20 to be joined in the assembly process. Building blocks 20 may include one or more interfacial surfaces 22. Interfacial surfaces 22 may be those parts on one building block 20 that will be connected to another building block 20. In such examples, Step 120 may be performed to maximize the area of interfacial surfaces 22 in order to create a larger bonded surface when building blocks 22 are joined.

Steps 110 and 120 may be performed by a computer processing system. The processing system may be configured to read CAD file 10, analyze the representation of final part 1, and produce mesh file 12 consisting of any number of building blocks 20. The processing system may include any device for executing code or logic instructions (e.g., software or firmware), such as a microcontroller, a digital signal processor (DSP), an application specific integrated controller (ASIC), electrically-programmable read-only memory (EPROM), or a field-programmable gate array (FPGA). Maximization of interfacial surfaces can be accomplished with appropriate computer programming during Step 120.

At Step 130, building blocks 20 are physically created and stacked together according to the representations in mesh file 12. Building blocks 20 may be created by any appropriate process. For example, building blocks 20 may be collected from a store or inventory of pre-existing blocks. As another example, building blocks 20 may be formed on demand by any appropriate rapid prototyping process. Building blocks 20 may be of any suitable material based on the design and application intended for final part 1. The stack of building blocks 20 created by Step 130 may include building blocks of a single material, or any combination of materials. For example, Step 130 may incorporate strategically planned building blocks 20 made of nickel titanium, some other titanium alloy, titanium aluminide or other suitable material configured for use as active control structures. As explained below, active control elements may be incorporated into the structure for eventual use as actuators for use in adjusting the shape or form of final part 1 during its use.

Step 130 may be performed in any appropriate manner. For example, Step 130 may be completed by a technician collecting building blocks 20 from an on-site inventory and stacking them together. In another embodiment of the present disclosure, Step 130 may be performed by an automated robotic forming and stacking system (not shown). The forming and stacking system may include a rapid prototyping system to create each of the individual building blocks 20. The forming and stacking system may further include a manipulation system to stack building blocks 20 in the proper sequence indicated by mesh file 12.

If necessary for support of building blocks 20 during Step 130, some means of support may be used, particularly for overhangs, openings, or pockets. To this end, it may be possible to provide an adhesive property into the reactive coating that is to be subsequently fused in Step 140. Another alternative is to build a sacrificial "scaffold", which can be later removed. The scaffold can be made from the building blocks 20 or some other material.

At Step 140, an interfacial joining process connects building blocks 20 in the configuration indicated by mesh file 12 resulting in composite part 40. Step 140 may include any process in which building blocks 20 are fused into a unified composite structure and may be selected based upon factors such as cost effectiveness, anticipated production levels, and tolerance of the process to dimensional variance in building blocks 20. For example, Step 140 may include the application of surface interfacial treatments to interfacial surfaces 22 of building blocks 20, and may further include the activation of the surface interfacial treatments. Typically, the reaction is an exothermic type reaction.

Interfacial surfaces 22 may include any portion of building block 20 that may be joined to another building block 22 (or to a separate part in subsequent assembly). In some embodiments, interfacial surfaces 22 are identified by Step 120 and/or the information represented in mesh file 12.

The application of surface interfacial treatments to building blocks 20 may include any process for uniformly applying appropriate reactants to interfacial surfaces 22. These reactants may be of the type referred to as surface-applied precursors for self-propagating high temperature synthesis. For example, the application of surface interfacial treatments may include physical vapor deposition, thermal spray, wet slurry, dry powder compact, and/or additional physical or chemical coatings and processes. The surface precursor, when activated, generates the heat and metallurgical reaction necessary for final structural integrity.

In some embodiments, Step 140 is primarily a chemical process, but Step 140 may include electrical, thermal, mechanical or optically activated surface interfacial treatments. Step 140 may be chosen from any process providing a robust and uniform joint in order to produce high strength bonds.

At Step 150, composite part 40 is converted into final part 1. Step 150 may include any appropriate machining or finishing process to convert a raw piece of material into a finished part. For example, Step 150 may include typical automated machining operations (e.g., drilling, milling, grinding, etc.). In embodiments including automated machining operations, Step 150 may refer to CAD file 10 to generate tool paths and/or operation instructions for computer controlled machining processes.

FIG. 2 compares a near-net shaped composite part 40 resulting from one embodiment of the present disclosure and a solid billet 50 used in conventional production methods. Both composite part 40 and solid billet 50 may be used to make final part 1 as shown in FIG. 2. The process necessary to convert composite part 40 into final part 1 requires significantly less material removal than the process required to convert solid billet 50 into final part 1. A process using composite part 40 will require less time to finish than one using solid billet 50. A process using composite part 40 will result in lower parts costs due to reduced waste material and less machining time required. Certain configurations for final part 1 result in 50% to 90% waste material from solid billet 50. The same configurations may result in less than 5% waste material if machined from near-net shaped composite part 40. In addition, a process using near-net shaped composite part 40 may reduce required machining time by up to 95%.

According to one embodiment of the present disclosure, the process of FIG. 1 may also provide reduced costs when compared to conventional foundry methods. Conventional foundry methods may require molds and/or tooling to create and maintain. In contrast, the process of FIG. 1 provides flexibility and the ability to produce a variety of dissimilar parts in sequence without changes in tooling set-ups. The process of FIG. 1 may also provide the opportunity to make large components without the fasteners typically seen in conventional processes. It has been estimated that this process may result in the elimination of up to 75% of the fasteners used to construct an aircraft or similar airframe.

FIG. 3 depicts a portion of a generic composite part 40 using building blocks 20 according to one embodiment of the present disclosure. As illustrated, building blocks 20 may be of both uniform size and shape. As discussed in relation to FIG. 1, building block 20 may have any physical configuration amenable to the process disclosed herein. In some embodiments, such as that shown in FIG. 3, building block 20 may have a physical configuration designed to provide potential weight reduction. Building block 20 may be designed with geometric features effectively reducing the density of composite part 40 at the same time preserving sufficient surface area to provide interfacial surfaces 22 for use in Step 140. Building blocks 20 may include solid or non-solid three dimensional shapes.

The example of FIG. 3 is just one alternative for a stacking arrangement for use in Step 130. In the alternative shown in FIG. 3, each building block 20 has the shape of a three-sided "u-channel", e.g., an open channel having a u-shaped profile. Each channel has two sides and a top. The joints of the near-net shape part are formed by joining an outer face of one side of a first block to an inner face of one side of a second block, or by joining the top of one block to the top of another block.

Various alternatives for building blocks 20 include any open channels, having any number of flat-sides with various geometric profiles. As another example, the open channel could have a v-profile, e.g., an open channel having two flat sides.

The building blocks might also be closed channels, such as square tubing, e.g., a square profile. Any outer face of one block could be joined to an outer face of another block. The closed channel could have any rectangular profile. More, generally, a closed channel building block could have various other closed flat-sided geometric profiles, such as octagonal or hexagonal.

Both open and closed channel building blocks are referred to herein as "hollow" building blocks. However, the same concepts could be applied to building blocks that are solid rather than hollow. As another alternative, the building blocks could have an internal filler or web. In the most general sense, building blocks 22 may include be described in terms of having any geometrical shape that provides sufficient surface area to serve as interfacial surface 22.

Also, the building blocks may have varying proportions of length, height, and width. For example, the channel building blocks described above are typically long relative to their height and width, but need not be so. For example, an example of a building block that is four-sided, closed, and hollow might be a ¾ inch cube.

A feature of the hollow building blocks described above is that they may provide structural stiffness akin to honeycomb structures. If the building blocks are dimensionally longer in one direction, this could result in a differential stiffness in that direction. This feature could be used to advantage depending on the particular piece to be constructed from the building blocks. Typically, a part will be constructed from building blocks all of the same type, but this need not be the case.

An additional feature of the invention is the ability to incorporate smart "active" elements into the final structure or part. For example, the active elements may be made from nickel titanium or other shape memory alloy, incorporated during Step 130. An advantage of using nickel titanium is that it is particularly compatible with the reactants used in Step 140. The active element may be a single piece or may be made from a number of building blocks. Alternatively, an active element may be attached to a part at any time subsequent to Step 130.

Once the structure is fused in Step 140, and even after the final part (or structure) is finished the active elements remain in place as active elements. The active element can be stimulated to expand or contract, thereby altering the shape of the final part. An active element can be used to allow motion within or adjacent a part in the final structure.

Although the present disclosure and its advantages have been described in detail, it should be understood that various changes, substitutions and alternations can be made herein without departing from the spirit and scope of the disclosure as defined by the following claims. For instance, although the disclosure has been discussed in specific relation to aircraft and aviation components, a person having ordinary skill in the art may also be able to apply the teachings of this disclosure to a myriad of structural forms, configurations and industries, as well as substituting materials of construction and physical geometries of the building blocks.

What is claimed is:

1. A method of manufacturing a machinery part, comprising:
  modeling the part as data capable of being manipulated by a computer;
  using the computer to transform the data into a format wherein the machinery part is represented as a near-net structure made from channel-shaped building blocks;
  wherein the building blocks are of uniform shape and each building block is a single piece of material and has a shape that is entirely that of an open three-sided or two-sided channel having flat sides;
  wherein each building block is at least partially coated with a reactive coating that also has an adhesive property, such that flat sides of building blocks adhere upon contact to each other when and may thereby be interfacially adjoined;
  delivering the data to an automated stacking system;
  using the stacking system to assemble the building blocks, using only gravity or the adhesive property of adjoining flat sides for support, to form the near-net structure;
  wherein the near-net structure is assembled with a stacking process that requires no internal or external support other than the building blocks themselves to support the assembly;
  fusing the building blocks with a reaction-activation process, such that the reactive coating causes any adjoining flat sides of the building blocks to be fused together;
  wherein the building blocks have a surface precursor, and the step of fusing the building blocks is performed by activating the precursor; and removing excess material from the near-net structure to form the machinery part.

2. The method of claim 1, wherein the channel shape has a three-sided "u" profile.

3. The method of claim 1, wherein the channel shape has a two-sided "v" profile.

4. The method of claim 1, wherein each side of each building block has an inner face and an outer face, and wherein the joining step is performed such that an inner face of at least one building block is fused to an outer face of another at least one building block.

5. The method of claim 1, wherein the reaction-activation process has activation phase performed by one of the following processes: chemical, electrical, thermal, mechanical, or optical.

6. The method of claim 1, wherein at least one of the building blocks is an active element, which can be stimulated to allow expansion or contraction of its shape.

7. The method of claim 6, wherein the active element is made from a shape memory alloy.

* * * * *